US011244375B2

(12) United States Patent
Cuan et al.

(10) Patent No.: US 11,244,375 B2
(45) Date of Patent: Feb. 8, 2022

(54) CONTEXT BASED RECOMMENDATIONS USING MACHINE LEARNING

(71) Applicant: Capital One Services, LLC, McLean, VA (US)

(72) Inventors: Lukiih Cuan, Washington, DC (US); Dakyung Song, Arlington, VA (US); Vincent Ngo, Mclean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/899,670

(22) Filed: Jun. 12, 2020

(65) Prior Publication Data

US 2021/0390604 A1  Dec. 16, 2021

(51) Int. Cl.
| | |
|---|---|
| *G06Q 30/00* | (2012.01) |
| *G06Q 30/06* | (2012.01) |
| *G06Q 30/02* | (2012.01) |
| *H04L 29/08* | (2006.01) |
| *G06N 20/00* | (2019.01) |

(52) U.S. Cl.
CPC ......... *G06Q 30/0631* (2013.01); *G06N 20/00* (2019.01); *G06Q 30/0255* (2013.01); *G06Q 30/0257* (2013.01); *G06Q 30/0277* (2013.01); *G06Q 30/0637* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 8,102,253 B1 | 1/2012 | Brady, Jr. | |
| 8,374,588 B2 | 2/2013 | Hurst | |
| 10,650,436 B1* | 5/2020 | Porto Arantes | .... G06Q 30/0214 |
| 2010/0280879 A1 | 11/2010 | O'Sullivan et al. | |
| 2012/0109749 A1 | 5/2012 | Subramanian et al. | |
| 2013/0268391 A1* | 10/2013 | Esch | ...................... G06Q 30/02 |
| | | | 705/26.7 |
| 2014/0279205 A1* | 9/2014 | Ganesh | .................. G06Q 50/01 |
| | | | 705/26.7 |

* cited by examiner

*Primary Examiner* — Mila Airapetian
(74) *Attorney, Agent, or Firm* — Banner & Witcoff, Ltd.

(57) ABSTRACT

Gift givers typically find the process of selecting a personalized gift for a gift recipient to be time consuming with a low likelihood that the selected gift will be positively received by the recipient. The present disclosure describes analyzing a gift recipient's transaction history using machine learning techniques. Based on the analysis, one or more gift recommendations are provided to the gift giver. The one or more gift recommendations may comprise links to purchase products associated with the one or more gift recommendations. Additionally or alternatively, the one or more gift recommendations may comprise information about where the product may be purchased. This may improve the overall accuracy of the gift giving process, while reducing the stress surrounding gift giving. Additionally, the commercial opportunities of businesses may be expanded by partnering with sites that host the analysis.

20 Claims, 4 Drawing Sheets

CONTEXT BASED RECOMMENDATIONS USING MACHINE LEARNING

FIELD OF USE

Aspects described herein generally relate to determining context utilizing machine learning, and hardware and software related thereto. More specifically, one or more aspects describe herein provide context based recommendations using machine learning.

BACKGROUND

Gift giving is a tradition that many users find time-consuming and challenging. Gifts need to be targeted based on the recipient's interests and fit within the gift giver's budget.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The present disclosure describes an application that analyzes a potential gift recipient's transaction history using machine learning techniques to provide one or more gift recommendations to the gift giver. In addition to the one or more gift recommendations, the application may include links to purchase products associated with the one or more gift recommendations. Additionally or alternatively, the application may provide other information, such as local stores that have the one or more gift recommendations available for purchase. This improves the accuracy of the gift giving process, while reducing the stress surrounding gift giving. Additionally, the application described herein expands the commercial opportunities of entities associated with the application.

According to one aspect, the disclosure relates to a computer-implemented method that includes receiving, from a first device associated with a first account holder, a request for a gift recommendation targeted towards a second account holder. The method includes sending, to a second device associated with the second account holder and based on the receiving the request for a gift recommendation, a request to access a transaction history of the second account holder. The transaction history of the second account holder comprises a plurality of transactions associated with a financial account of the second account holder. The method includes receiving, based on the sending of the request, a response from the second device. The method includes based on determining that the response comprises an approval of the second account holder to access the transaction history of the second account holder, determining, based on the transaction history of the second account holder, a plurality of transaction histories of a plurality of account holders, and a machine learning algorithm, one or more contextual features associated with the gift recommendation. Determining, based on the one or more contextual features associated with the gift recommendation, one or more merchants, merchant categories, or products relevant for the gift recommendation. Sending, to the first device, the gift recommendation comprising the one or merchants, merchant categories, or products.

According to another aspect, the disclosure relates to an apparatus that includes one or more processors, and a memory storing computer-readable instructions. The computer-readable instructions, when executed by the one or more processors, cause the apparatus to receive, from a first device associated with a first account holder, a request for a gift recommendation targeted towards a second account holder. The computer-readable instructions, when executed by the one or more processors, cause the apparatus, to send to a second device associated with the second account holder and based on the receiving the request for a gift recommendation, a request to access a transaction history of the second account holder. The transaction history of the second account holder comprises a plurality of transactions associated with a financial account of the second account holder. The computer-readable instructions, when executed by the one or more processors, cause the apparatus receive, based on the sending of the request, a response from the second device. The computer-readable instructions, when executed by the one or more processors, cause the apparatus to based on determining that the response comprises an approval of the second account holder to access the transaction history of the second account holder: determine, based on the transaction history of the second account holder, a plurality of transaction histories of a plurality of account holders, and a machine learning algorithm, one or more contextual features associated with the gift recommendation. The computer-readable instructions, when executed by the one or more processors, cause the apparatus to determine, based on the one or more contextual features associated with the gift recommendation, one or more merchants, merchant categories, or products relevant for the gift recommendation. The computer-readable instructions, when executed by the one or more processors, cause the apparatus send to the first device, the gift recommendation comprising the one or merchants, merchant categories, or products.

According to another aspect, the disclosure relates to non-transitory machine-readable medium storing instructions that, when executed by one or more processors, cause the one or more processors to perform steps comprising receiving, from a first device associated with a first account holder, a request for a gift recommendation targeted towards a second account holder. The steps also comprise sending, to a second device associated with the second account holder and based on the receiving the request for a gift recommendation, a request to access a transaction history of the second account holder. The transaction history of the second account holder comprises a plurality of transactions associated with a financial account of the second account holder. The steps comprise receiving, based on the sending of the request, a response from the second device. The steps comprise: based on determining that the response comprises an approval of the second account holder to access the transaction history of the second account holder: determining, based on the transaction history of the second account holder, a plurality of transaction histories of a plurality of account holders, and a machine learning algorithm, one or more contextual features associated with the gift recommendation. The transaction history associated with the financial account of the second account holder comprises: a plurality of transactions filtered, based on at least one of a predetermined date range, a predetermined time range, or a geographic location. The steps comprise determining, based on the one or more contextual features associated with the gift recommendation, one or more merchants, merchant categories, or products relevant for the gift recommendation. The steps comprise appending, to the one or more merchants, merchant categories, or products, at least one similar merchant, merchant category, or product not associated with the transaction history of the second account holder. The steps comprise sending, to the first device, the gift recommendation comprising the one or merchants, merchant categories, or products. The sending comprises: prioritizing the one or more merchants, merchant categories, or products based on determining a cash flow based on a transaction history associated with a financial account of the first account holder. The steps comprise prioritizing the one or more merchants, merchant categories, or products based on a transaction average associated with the transaction history of the second account holder and the at least one merchant. The steps comprise prioritizing the one or more merchants, merchant categories, or products based on a transaction history associated with a financial account of the first account holder. The steps comprise periodically monitoring a location of the first device for a predetermined period of time. The steps comprise sending, to the first device and based on a determination that a current location of the first device is within a predetermined distance of at least one merchant of the one or more merchants, merchant categories, or products, a notification indicating: the at least one merchant; and a distance between the at least one merchant and the current location of the first device.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for determining targeted recommendations associated with gift giving. Access to an account holder's transaction data may only be visible to the account holder. In other words, an account holder's transaction data is typically not made visible to other account holders and/or users. Therefore, existing techniques for providing a gift giver with targeted recommendations for an account holder (e.g. gift recipient) may not utilize the transaction data of the account holder (e.g. gift recipient). Gift givers often find the process of selecting a personalized gift for a gift recipient to be time consuming with a low likelihood that the selected gift will be positively received by the recipient.

Systems and methods as described herein may utilize machine learning and leverage big data analysis of transaction data of a gift recipient and others to provide recommendations targeted towards a specific gift recipient. The systems and methods disclosed herein improve the process of selecting a gift that is targeted for the recipient based on the recipient's transaction history as well as other account holder's transaction histories. This may expand the commercial opportunities of entities associated with the processes described herein. The systems and methods disclosed herein may reduce the time that a gift giver needs to spend browsing websites and online merchants for personalized and targeted gifts, for example, by providing links to purchase products associated with one or more gift recommendations or other information about where the gift recommendations may be purchased. This may also have the advantageous effect of reducing online traffic prior to major holidays that involve gift giving. Moreover, the systems and methods disclosed herein increase the likelihood that a gift purchased for a gift recipient by a gift giver based on the targeted recommendations will be positively received by the gift recipient because the targeted recommendations are determined based on a transaction history of the gift recipient.

Figure 1:
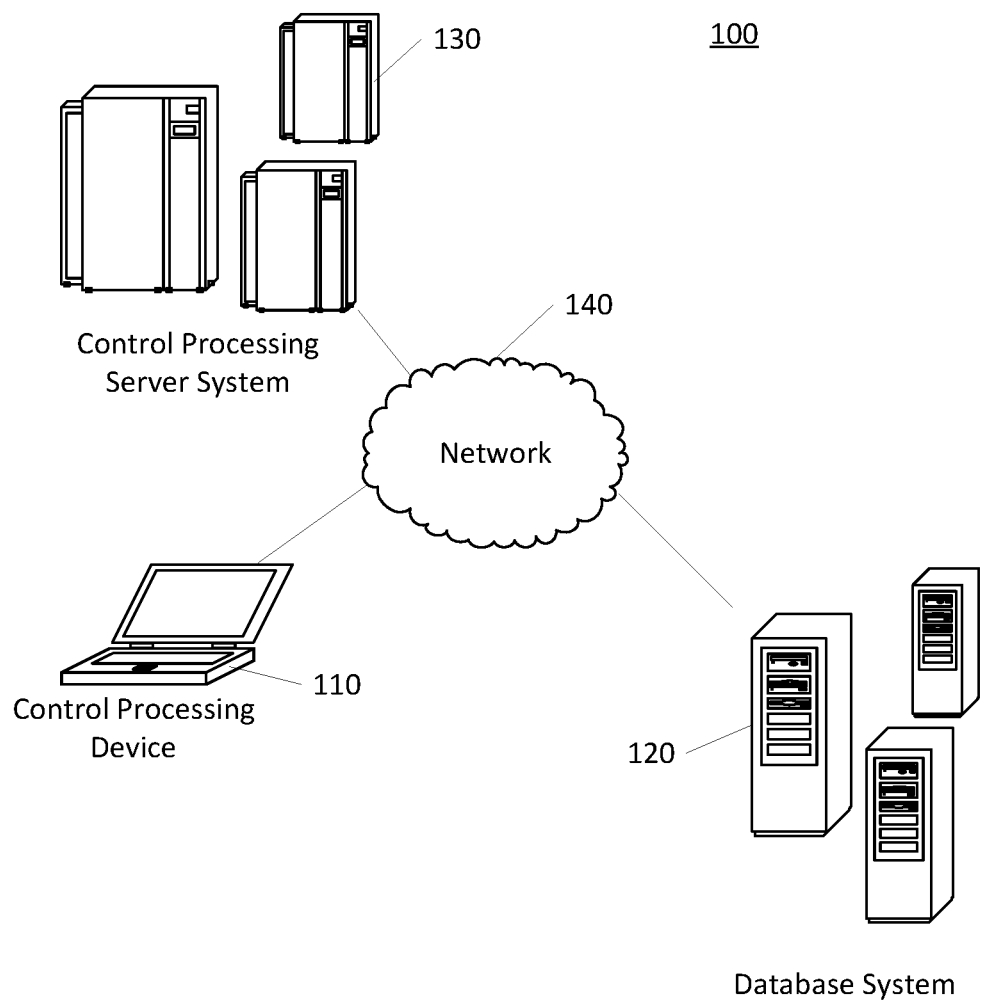
FIG. 1 shows an example of a control processing system in which one or more aspects described herein may be implemented.

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing, maintaining, and updating large volumes of data across clusters of nodes. Database system 120 may provide a variety of databases including, but not limited to, relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
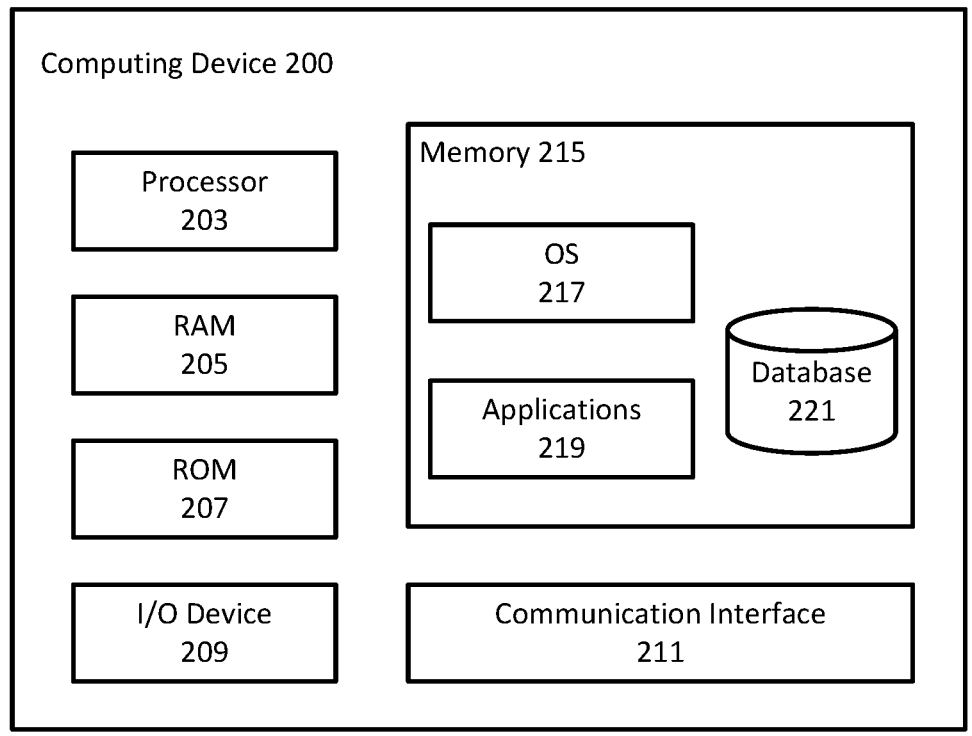
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device. Additionally or alternatively, computing device 200 may represent, be incorporated in, and/or include various devices such as the first user device 305, the second user device 310, and the server 315 shown in FIG. 3.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
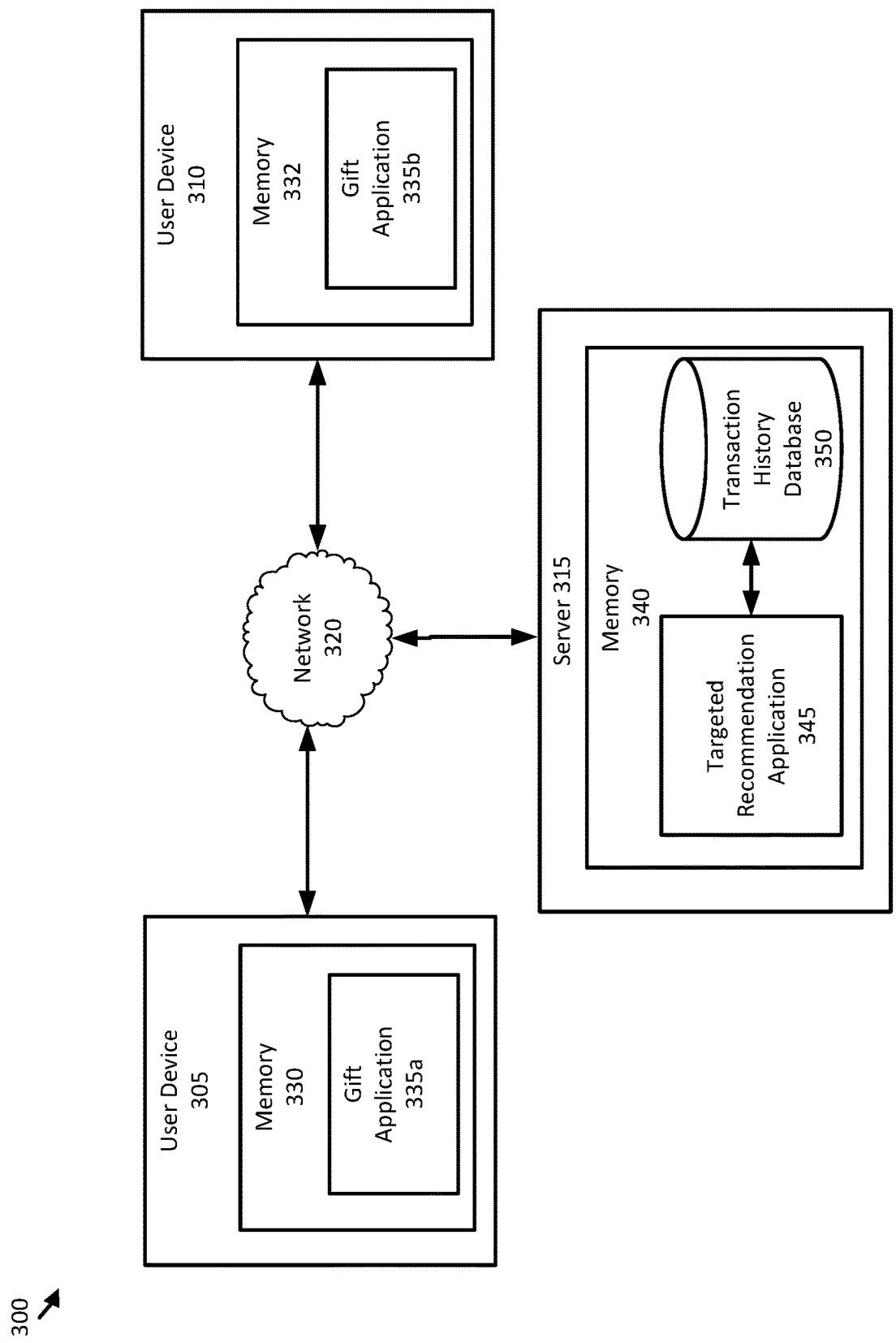
FIG. 3 shows an example system for performing context based recommendations using machine learning.

FIG. 3 shows an example system 300 for providing recommendations, to a gift giver, that are targeted to the gift recipient based on leveraging machine learning algorithms and/or a transaction history of a gift recipient. The system 300 includes a first user device 305, a second user device 310, and a server 315 interconnected over a network 320.

The first user device 305 may be any one of the devices described above. In this regard, first user device 305 comprise a processor (not shown) and a memory 330. Memory 330 may include one or more applications, such as a gift application 335a. A gift giver may, via the gift application 335a executing on the first user device 305, submit a request for a recommendation targeted towards a gift recipient. The request submitted by the gift giver may be transmitted from the first user device 305 to the server 315.

The server 315 may be any suitable computing device, such as server system 130, database system 120, computing device 200, or any combination thereof. Server 315 may comprise a processor (not shown) and a memory 340. Memory 340 of the server 315 may include a transaction history database 350 and/or one or more applications, such as a targeted recommendation application 345. The targeted recommendation application 345 may, based on receiving the request for the recommendation from the first user device 305, generate a notification for the gift recipient. The notification may indicate that the gift giver has requested a recommendation targeted towards the gift recipient. The notification may also request the gift recipient's permission to utilize a transaction history of the gift recipient in order to determine the targeted recommendation. The notification may be transmitted from the server 315 to a user device associated with the gift recipient, such as the second user device 310.

Like the first user device 305, the second user device 310 may be any of the devices described herein. The second user device 310 may comprise a processor (not shown) and a memory 332. Memory 332 may include one or more applications, such as gift giving application 335b. When the notification is received by the second user device 310, the gift giving application 335b may display the notification within the second user device 310. The gift recipient may respond to the notification by authorizing or not authorizing access to the gift recipient's transaction history in order to determine a recommendation targeted towards the gift recipient. If the gift recipient authorizes use of the gift recipient's transaction history, then the gift recipient may also specify which parts of their transaction history is visible. For example, the gift recipient may specify one or more transactions and/or transactional data that they do not want to make visible to the gift giver. Accordingly, the one or more transactions and/or transactional data may be excluded from the analysis performed to generate a targeted recommendation. For example, the gift recipient may choose to not expose or make visible some transactions that the gift recipient wishes to keep private. The gift recipient may also filter the transaction history based on range of dates and/or times. The application 335b may cause the gift recipient's response to be transmitted from the second user device 310 to the server 315.

The server 315 may receive the gift recipient's response from the second user device 310. Based on the gift recipient's response, the targeted recommendation application 345 executing on the server 315 may determine whether to provide the targeted recommendation to the gift giver. For example, if the gift recipient did not give permission and/or authorization for the gift giver to utilize the gift recipient's transaction history, then the targeted recommendation application 345 does not proceed with analyzing the gift recipient's transaction data. Accordingly, the targeted recommendation application 345 may not determine a targeted recommendation. Instead, the targeted recommendation application 345 may generate a message indicating that the gift recipient did not provide authorization for the gift giver to access the gift recipient's transaction data. The message may be sent from the server 315 to the first user device 305. However, if the gift recipient authorized the gift giver to access the gift recipient's transaction history, then the targeted recommendation application 345 may analyze the gift recipient's transaction data to determine one or more targeted gift recommendations.

As noted above, memory 340 may include transaction history database 350. Transaction history database 350 may store the transaction histories of a plurality of account holders associated with one or more financial accounts. The plurality of account holders may include the gift recipient. The targeted recommendation application 345 may determine the targeted recommendation by interfacing with the transaction history database 350 to retrieve the transaction history of the gift recipient. The transaction history of the gift recipient may comprise transactions associated with a financial account of the gift recipient. The information for each transaction may include a transaction amount, a merchant, a location of the merchant, a product, a payment method, a data/time of purchase, etc.

The targeted recommendation application 345 may select specific transactions from the transaction history of the gift recipient. As described above, the gift recipient may choose to exclude one or more specific transactions. Thus, the merchants, merchant categories, and/or products associated with these transactions may be omitted from being considered in the determination of the targeted recommendation. In some instances, transactions may be filtered based on a predetermined date/time range. For example, transactions that are more than three months old may be omitted. Accordingly, the merchants, merchant categories, and/or products associated with transactions older than three months may be excluded from the targeted recommendation analysis. A transaction may be excluded based on a location of a user device associated with the gift recipient at the time the transaction was conducted. For example, if a transaction was conducted in another country when the gift recipient was travelling, this transaction may not be included. Transactions may also be filtered based on a current location of first user device 305. For example, transactions that were not conducted within a predetermined distance from a current location of the first user device 305 may be excluded. Therefore, the merchants, merchant categories, and/or products associated with these transactions may be excluded from the targeted recommendation analysis.

The targeted recommendation application 345 may determine contextual features associated with the gift giver's requested targeted recommendation. The contextual features may be determined based on the transactions selected from the gift giver's transaction history as well as the transaction data in the transaction histories of other account holders in the transaction history database 350. The contextual features may also be based on a context specified by the gift giver. For example, the gift giver may indicate whether the gift is an anniversary present, or a birthday present or a relationship between the gift giver and the gift recipient. Machine learning may be leveraged to remove merchants, merchant categories, and/or products that have been shown to be not gift-friendly in the past. For example, transactions related to the purchase of automobile insurance and/or the purchase of fuel at gas stations may be excluded. Machine learning may also be leveraged to group shoppers (i.e. account holders) that have similar shopping patterns as the gift recipient in order to recommend a merchant that the group of shoppers frequently visit, even if the gift recipient has not shopped with that merchant before. For example, the targeted recommendation application 345 may recommend a coffee beans based on information indicating that the gift recipient recently purchased a coffee maker, and was given a coffee bean grinder as a gift by another gift giver. A specific type of coffee bean may be recommended based on the shopping patterns of shoppers that are similar to the gift recipient.

Based on the contextual features, the targeted recommendation application 345 may determine a set of merchants, merchant categories, and/or products associated with the selected transactions. The targeted recommendation application 345 may append one or more similar merchants, merchant categories, and/or products that do not appear in the determined set of merchants, merchant categories, and/or products. The targeted recommendation application 345 may prioritize the set of merchants, merchant categories, and/or products based on an average transaction amount associated with each merchant. For example, merchants may be ranked based on an average amount spent by the gift recipient for the transactions that the gift recipient conducted with each of the merchants. The targeted recommendation application 345 may prioritize the set of merchants, merchant categories, and/or products based on a merchant's geographic location. For example, merchants that are located closer to the gift giver may be ranked higher. The prioritizing may also be based on a merchant's category (e.g. retailers and department stores are likely to be higher than restaurants), or frequency of a merchant appearing in lists of transactions (e.g. if one gift recipient tends to frequently shop at Merchant A, then Merchant A will likely to be ranked higher). The prioritizing may be based on how recently the gift recipient shopped with the merchant (e.g. if the gift recipient shopped at Merchant A very recently, then Merchant A may be ranked lower).

The targeted recommendation application 345 may also access the transaction history of the gift giver. The gift giver may, via the gift application 335a, authorize the targeted recommendation application 345 to access to the transaction histories of one or more financial accounts associated with the gift giver. The targeted recommendation application 345 may access the transaction histories associated with the gift giver to determine a cash flow and/or budget for the gift giver. The targeted recommendation application 345 may prioritize the determined set of merchants, merchant categories, and/or products based on a cash flow and/or budget of the gift giver. For example, merchants and/or merchant categories that on average have been associated with transaction amounts within a budget range may be selected while others may be excluded. For example, if the gift giver has in the past not spent more than $10 at merchants similar to the merchants that are to be recommended, then these merchants may be excluded from the targeted recommendation. The targeted recommendation application 345 may also filter certain transactions based on an upper and/or lower limit on the price for the gift specified by the gift giver via the gift application 335. For example, some people may be willing to spend more on gifts that on themselves. Even if the gift giver may not be willing to spend more than $100 on a product from Merchant A, he or she may be willing to spend $150 on a product at Merchant A if that product is meant to be a gift. In some instances, merchants may be excluded or removed from the recommendations if it was reported that they were involved in fraudulent activities.

The targeted recommendation application 345 may provide one or more targeted recommendations to the gift giver. The recommendations may include options for purchasing recommended products. The options may be determined based on inventory information provided by merchants.

The targeted recommendation application 345 may request the gift giver's permission to periodically and/or for a predetermined period of time, monitor a location of the first user device 305. If the gift giver authorizes monitoring of the location of the first user device 305, then during the predetermined period of time, the targeted recommendation application 345 may notify the gift giver of a merchant and/or its distance from a current location of the first user device 305 if the current location of the first user device 305 is within a predetermined distance for a merchant in the set of merchants, merchant categories, and/or products. The notification may be a push notification that is sent from the server 315 to the first user device 305.

Figure 4:
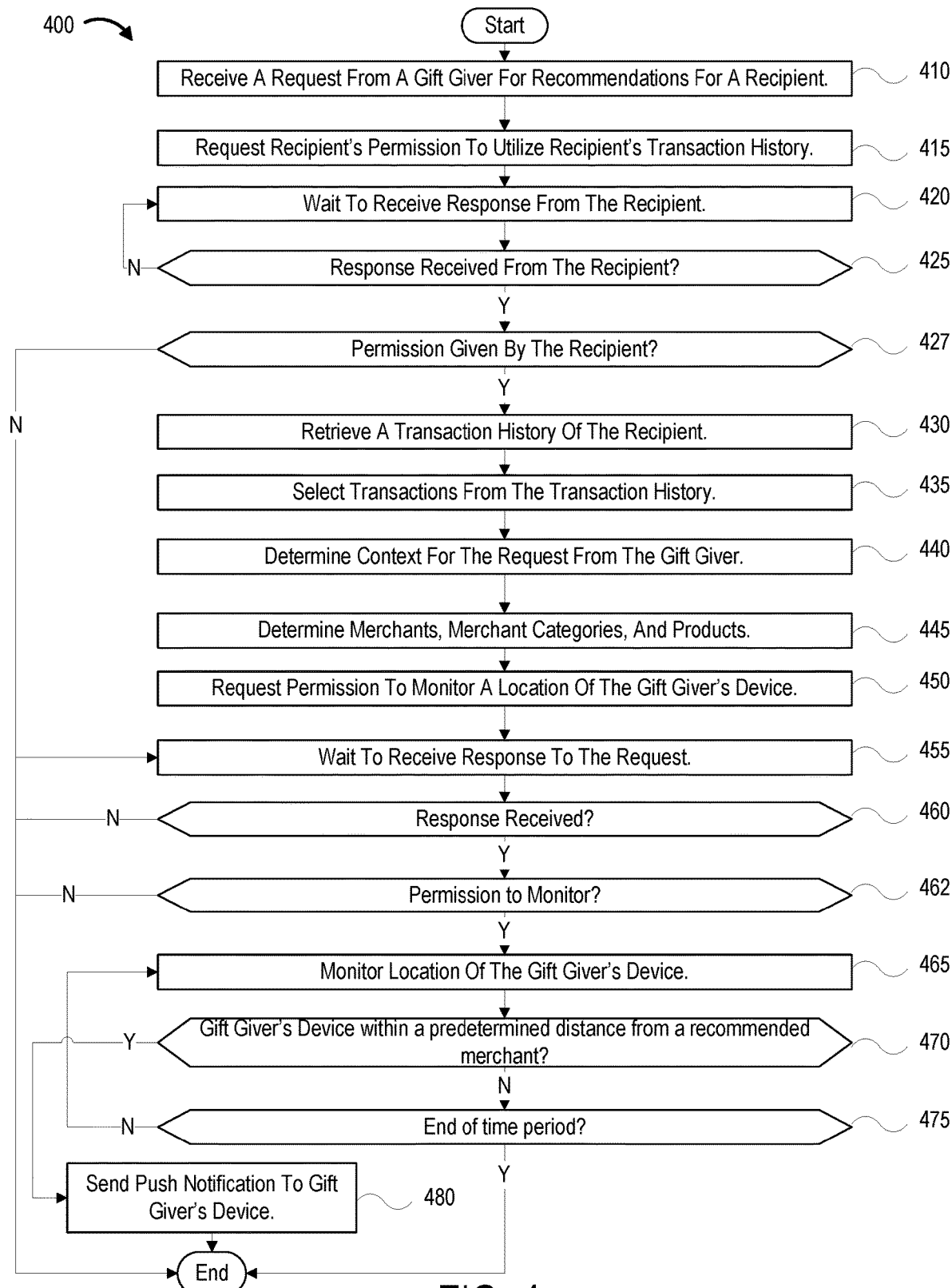
FIG. 4 shows a flow diagram of an example method for context based recommendations using machine learning.

FIG. 4 is a flow diagram of an example method 400 for providing gift recommendations based on leveraging user transaction histories and machine learning. Some or all of the steps of method 400 may be performed using one or more computing devices as described herein, including, for example, the server 315 (e.g. the targeted recommendation application 345 executing on the server 315). The steps of the method 400 may be modified, omitted, and/or performed in other orders, and/or other steps added.

A gift giver may, via the gift application 335a executing on the first user device 305, submit a request for a recommendation targeted towards a particular gift recipient. The request may comprise contextual information, such as who the gift is for (e.g., spouse, friend, sibling, parent, etc.), the occasion for the gift (e.g., birthday, anniversary, retirement, etc.), a price range for the gift, etc. The request submitted by the gift giver may be transmitted from the first user device 305 to the server 315. Other parameters that the gift giver can specify may be whether the recommended merchants be online or brick and mortar stores. Some retailers may only be available online, and the gift giver would most likely have to pay for shipping and indicate a delivery method. If brick and mortar store is acceptable, then the gift giver may also specify how a range of distance that the store can be located from the gift giver.

At step 410, a computing device (e.g. the targeted recommendation application 345 executing on the server 315) may receive the request for the recommendation. At step 415, a computing device (e.g. the targeted recommendation application 345 executing on the server 315) may generate a notification for the gift recipient, for example, based on receiving the request for the targeted recommendation. The notification may request the gift recipient's permission to utilize a transaction history of the gift recipient in order to determine the targeted recommendation. The notification may be sent from the server 315 to the second user device 310.

The gift recipient may receive the notification via the second user device 310. The notification may indicate that the gift giver has requested a recommendation targeted towards the gift recipient. The notification may also request the gift recipient's permission to utilize a transaction history of the gift recipient in order to determine the targeted recommendation. The notification may be transmitted from the server 315 to a user device associated with the gift recipient, such as the second user device 310. The notification may be displayed by the second user device 310. The gift recipient may respond to the notification by authorizing or not authorizing access to the gift recipient's transaction history in order to determine a recommendation targeted towards the gift recipient. If the gift recipient authorizes use of the gift recipient's transaction history, then the gift recipient may also exclude specific transactions. For example, the recipient may specify transactions and/or transaction data that the recipient wishes to not be visible to the gift giver. The specified transactions are excluded from being selected for the targeted recommendation. For example, the gift recipient may choose to not expose or make visible some transactions that the gift recipient wishes to keep private. The gift recipient may also filter the transaction history based on a date/time range. The gift recipient's response may be transmitted from the second user device 310 to the server 315.

At step 420, a computing device (e.g. the targeted recommendation application 345 executing on the server 315) may wait to receive the gift recipient's response. At step 425, a computing device (e.g. the targeted recommendation application 345 executing on the server 315) may determine whether the gift recipient's response was received. If the gift recipient's response was received, then the method 400 proceeds to step 427. Otherwise, the method 400 returns to step 420.

At step 427, a computing device (e.g. the targeted recommendation application 345 executing on the server 315) may determine if the gift recipient's response includes the gift recipient's permission to utilize the gift recipient's transaction history. If the gift recipient gives permission to utilize the gift recipient's transaction history, then the method 400 proceeds to step 430. Otherwise, a message indicating that the gift recipient's permission was not given for the targeted recommendation may be sent from the server 315 to the first user device 305 and the method 400 ends.

At step 430, a computing device (e.g. the targeted recommendation application 345 executing on the server 315) may interface with a transaction history database, such as transaction history database 350, to retrieve the transaction history of the gift recipient.

At step 435, a computing device (e.g. the targeted recommendation application 345 executing on the server 315) may select transactions from the transaction history of the gift recipient. As described above, the gift recipient may choose to exclude specific transactions. The merchants, merchant categories, and/or products associated with these transactions may be excluded from being considered in the determination of the targeted recommendation. Transactions may be filtered based on a predetermined date/time range, based on a location of a user device associated with the gift recipient when a transaction was conducted, and/or based on a current location of a user device associated with the gift giver.

At step 440, a computing device (e.g. the targeted recommendation application 345 executing on the server 315) may determine one or more contextual features associated with the gift giver's requested targeted recommendation. At step 445, a computing device (e.g. the targeted recommendation application 345 executing on the server 315) may determine a set of merchants, merchant categories, and/or products associated with the selected transactions based on the context. Similar merchants, not already included in the set, may be appended to the set of merchants, merchant categories, and/or products. The set of merchants, merchant categories, and/or products may be prioritized based on an average transaction amount associated with each merchant, and/or based on a cash flow or budget of the gift giver. As discussed above, machine learning may be leveraged to remove merchants, merchant categories, and/or products that have been shown to be not gift-friendly in the past. Machine learning may also be leveraged to group shoppers (i.e. account holders) that have similar shopping patterns as the gift recipient in order to recommend a merchant that the group of shoppers frequently visit, regardless of whether the gift recipient has shopped with that merchant before. A recommendation may be provided to the gift giver along with options to purchase the products of the recommendation.

At step 450, a computing device (e.g. the targeted recommendation application 345 executing on the server 315) may request the gift giver's permission to periodically and for a predetermined period of time, monitor a location of the first user device 305. At step 455, a computing device (e.g. the targeted recommendation application 345 executing on the server 315) may wait to receive the gift giver's response to the request to monitor a location of the first user device 305. At step 460, a computing device (e.g. the targeted recommendation application 345 executing on the server 315) may determine whether the gift giver's response has been received. If the gift giver's response has been received, then the method 400 proceeds to step 462. Otherwise, the method 400 returns to step 455.

At step 462, a computing device (e.g. the targeted recommendation application 345 executing on the server 315) may determine whether the gift giver's response includes the gift giver's permission to monitor the location of the first user device 305. If the comprises the gift giver's permission to monitor the location of the first user device 305, the method 400 proceeds to step 465. Otherwise, the method 400 ends. At step 465, a computing device (e.g. the targeted recommendation application 345 executing on the server 315) may periodically monitor the location of the first user device 305. The location may be monitored for a predetermined period of time.

At step 470, a computing device (e.g. the targeted recommendation application 345 executing on the server 315) may determine whether the current location of the first user device 305 is within a predetermined distance from a merchant in the set of merchants, merchant categories, and/or products. If the current location of the first user device 305 is within a predetermined distance from a merchant in the set of merchants, merchant categories, and/or products, then the method 400 proceeds to step 480. Otherwise, the method 400 proceeds to step 475. At step 475, a computing device (e.g. the targeted recommendation application 345 executing on the server 315) may determine whether the predetermined time period for monitoring the location of the first user device 305 has ended. If the time period for monitoring has ended, then the method 400 ends. Otherwise, the method 400 returns to step 465.

At step 480, a computing device (e.g. the targeted recommendation application 345 executing on the server 315) may notify the gift giver of the recommended merchant and its distance from a current location of the gift giver. The gift giver may be notified via a push notification that is sent from the server 315 to the first user device 305. Based on receiving the push notification, the gift giver may choose to proceed to the recommended merchant to purchase a gift for the recipient. Otherwise, the gift giver may ignore the push notification and wait to receive another push notification in the future for the same or different recommended merchant.

In this manner, the systems and methods disclosed herein improve the process of selecting a gift that is targeted for the recipient. In this regard, various systems and methods disclosed herein improve the process of selecting a gift that is targeted for the recipient based on the recipient's transaction history as well as other account holder's transaction histories. The systems and methods disclosed herein reduce the time that a gift giver needs to spend browsing websites and online merchants for personalized and targeted gifts thus, advantageously reducing online traffic prior to major holidays that involve gift giving. Moreover, the systems and methods disclosed herein increase the likelihood that a gift purchased for a gift recipient by a gift giver based on the targeted recommendations will be positively received by the gift recipient because the targeted recommendations are determined based on a transaction history of the gift recipient.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
receiving, from a first device associated with a first account holder, a request for a gift recommendation targeted towards a second account holder;
sending, to a second device associated with the second account holder and based on the receiving the request for the gift recommendation, a request to access a transaction history of the second account holder, wherein the transaction history of the second account holder comprises a plurality of transactions associated with a financial account of the second account holder;
receiving, based on the sending of the request, a response from the second device; and
based on determining that the response comprises an approval of the second account holder to access the transaction history of the second account holder:
  determining, based on the transaction history of the second account holder, a plurality of transaction histories of a plurality of account holders, and a machine learning algorithm, one or more contextual features associated with the gift recommendation;
  determining, based on the one or more contextual features associated with the gift recommendation, one or more merchants, merchant categories, or products relevant for the gift recommendation; and
  sending, to the first device, the gift recommendation comprising the one or more merchants, merchant categories, or products.

2. The computer-implemented method of claim 1, comprising:
sending, to the first device and based on a determination that a current location of the first device is within a predetermined distance of at least one merchant of the one or more merchants, merchant categories, or products, a notification indicating the at least one merchant and a distance between the at least one merchant and the current location of the first device.

3. The computer-implemented method of claim 2, wherein sending comprises:
periodically monitoring a location of the first device for a predetermined period of time.

4. The computer-implemented method of claim 1, comprising:
appending, to the one or more merchants, merchant categories, or products, at least one similar merchant, merchant category, or product not associated with the transaction history of the second account holder.

5. The computer-implemented method of claim 1, wherein the gift recommendation is sent as a push notification.

6. The computer-implemented method of claim 1, wherein the sending comprises:
prioritizing the one or more merchants, merchant categories, or products based on a transaction average associated with the transaction history of the second account holder and the one or more merchants; and
sending, to the first device, the prioritized one or more merchants, merchant categories, or products.

7. The computer-implemented method of claim 1, wherein the sending comprises:

prioritizing the one or more merchants, merchant categories, or products based on a transaction history associated with a financial account of the first account holder; and sending, to the first device, the prioritized one or more merchants, merchant categories, or products.

8. The computer-implemented method of claim 1, wherein the sending comprises:
determining a cash flow based on a transaction history associated with a financial account of the first account holder;
prioritizing the one or more merchants, merchant categories, or products based on the determined cash flow; and
sending, to the first device, the prioritized one or more merchants, merchant categories, or products.

9. The computer-implemented method of claim 1, wherein the transaction history associated with the financial account of the second account holder comprises:
a plurality of transactions filtered, based on at least one of a predetermined date range, a predetermined time range, or a geographic location.

10. The computer-implemented method of claim 1, wherein the transaction history of the second account holder excludes one or more transactions based on criteria specified by the second account holder.

11. An apparatus comprising:
one or more processors; and
memory storing instructions that, when executed by the one or more processors, cause the apparatus to:
receive, from a first device associated with a first account holder, a request for a gift recommendation targeted towards a second account holder;
send, to a second device associated with the second account holder and based on the receiving the request for the gift recommendation, a request to access a transaction history of the second account holder, wherein the transaction history of the second account holder comprises a plurality of transactions associated with a financial account of the second account holder;
receive, based on the sending of the request, a response from the second device; and
based on determining that the response comprises an approval of the second account holder to access the transaction history of the second account holder:
determine, based on the transaction history of the second account holder, a plurality of transaction histories of a plurality of account holders, and a machine learning algorithm, one or more contextual features associated with the gift recommendation;
determine, based on the one or more contextual features associated with the gift recommendation, one or more merchants, merchant categories, or products relevant for the gift recommendation; and
send, to the first device, the gift recommendation comprising the one or more merchants, merchant categories, or products.

12. The apparatus of claim 11, wherein the instructions, when executed by the one or more processors, further cause the apparatus to:
send, to the first device and based on a determination that a current location of the first device is within a predetermined distance of at least one merchant of the one or more merchants, merchant categories, or products, a notification indicating: the at least one merchant; and a distance between the at least one merchant and the current location of the first device.

13. The apparatus of claim 11, wherein the instructions, when executed by the one or more processors, further cause the apparatus to:
send the gift recommendation by periodically monitoring a location of the first device for a predetermined period of time.

14. The apparatus of claim 11, wherein the instructions, when executed by the one or more processors, further cause the apparatus to:
append, to the one or more merchants, merchant categories, or products, at least one similar merchant, merchant category, or product not associated with the transaction history of the second account holder.

15. The apparatus of claim 11, wherein the gift recommendation is sent as a push notification.

16. The apparatus of claim 11, wherein the instructions to send further cause the apparatus to:
prioritize the one or more merchants, merchant categories, or products based on a transaction average associated with the transaction history of the second account holder and the one or more merchants; and
send, to the first device, the prioritized one or more merchants, merchant categories, or products.

17. The apparatus of claim 11, wherein the instructions to send further cause the apparatus to:
prioritize the one or more merchants, merchant categories, or products based on a transaction history associated with a financial account of the first account holder; and
send, to the first device, the prioritized one or more merchants, merchant categories, or products.

18. The apparatus of claim 11, wherein the instructions to send further cause the apparatus to:
determine a cash flow based on a transaction history associated with a financial account of the first account holder;
prioritize the one or more merchants, merchant categories, or products based on the determined cash flow; and
send, to the first device, the prioritized one or more merchants, merchant categories, or products.

19. The apparatus of claim 11, wherein the transaction history associated with the financial account of the second account holder comprises: a plurality of transactions filtered, based on at least one of a predetermined date range, a predetermined time range, or a geographic location.

20. A non-transitory machine-readable medium storing instructions that, when executed by one or more processors, cause the one or more processors to perform steps comprising:
receiving, from a first device associated with a first account holder, a request for a gift recommendation targeted towards a second account holder;
sending, to a second device associated with the second account holder and based on the receiving the request for the gift recommendation, a request to access a transaction history of the second account holder, wherein the transaction history of the second account holder comprises a plurality of transactions associated with a financial account of the second account holder;
receiving, based on the sending of the request, a response from the second device; and
based on determining that the response comprises an approval of the second account holder to access the transaction history of the second account holder:

determining, based on the transaction history of the second account holder, a plurality of transaction histories of a plurality of account holders, and a machine learning algorithm, one or more contextual features associated with the gift recommendation, wherein the transaction history associated with the financial account of the second account holder comprises a plurality of transactions filtered, based on at least one of a predetermined date range, a predetermined time range, or a geographic location;

determining, based on the one or more contextual features associated with the gift recommendation, one or more merchants, merchant categories, or products relevant for the gift recommendation;

appending, to the one or more merchants, merchant categories, or products, at least one similar merchant, merchant category, or product not associated with the transaction history of the second account holder; and sending, to the first device, the gift recommendation comprising the one or more merchants, merchant categories, or products, wherein the sending comprises:

prioritizing the one or more merchants, merchant categories, or products based on determining a cash flow based on a transaction history associated with a financial account of the first account holder;

prioritizing the one or more merchants, merchant categories, or products based on a transaction average associated with the transaction history of the second account holder and the at least one merchant;

prioritizing the one or more merchants, merchant categories, or products based on a transaction history associated with a financial account of the first account holder;

periodically monitoring a location of the first device for a predetermined period of time; and sending, to the first device and based on a determination that a current location of the first device is within a predetermined distance of at least one merchant of the one or more merchants, merchant categories, or products, a notification indicating:

the at least one merchant; and a distance between the at least one merchant and the current location of the first device.

* * * * *